Patented May 21, 1929.

1,713,591

UNITED STATES PATENT OFFICE.

ROBERT BERLINER, BERTHOLD STEIN, AND WILLY TRAUTNER, OF ELBERFELD, GERMANY, ASSIGNORS TO GRASSELLI DYESTUFF CORPORATION, OF NEW YORK, N. Y., A CORPORATION OF DELAWARE.

10-PHENYL-BENZANTHRONE AND DERIVATIVES OF THE SAME.

No Drawing. Application filed September 16, 1926, Serial No. 135,986, and in Germany October 20, 1925.

We have shown in our co-pending application, Serial No. 135,989 filed on even date that an intramolecular condensation takes place when cinnamylidene-anthrone compounds

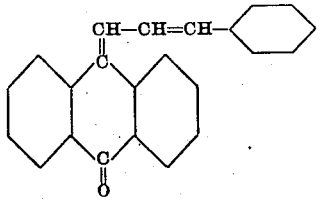

are heated to temperatures of about 250° C., the condensation products being 1-phenyl-benzanthrones.

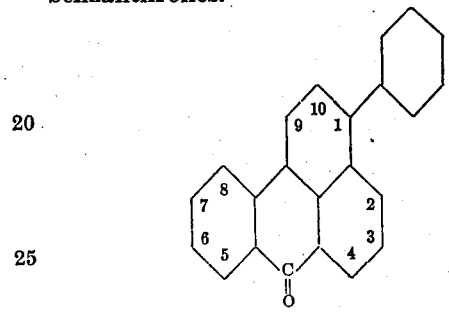

We have now found that by treating these 1-phenyl-benzanthrones with anhydrous aluminium chloride new compounds are formed. Analysis shows these novel compounds to be isomeric with the 1-phenyl-benzanthrone compounds. They differ from the latter however in their color and other chemical reactions as well as their melting points; the most remarkable difference is in the behavior of the two types of compounds with caustic alkali. As we have described and claimed in our co-pending application, Serial No. 135,987 filed on even date, alkali melt of the novel phenyl-benzanthrone produces a green vat dyestuff, whereas alkali melt of the 1-phenyl-benzanthrone does not produce such a vat dyestuff.

Elementary analysis shows that our novel benzanthrone compounds have the same composition as the parent material. By the action of the anhydrous aluminum chloride a migration of the phenyl group is effected. The new compounds are Bz-phenylbenzanthrones corresponding to the probable formula:

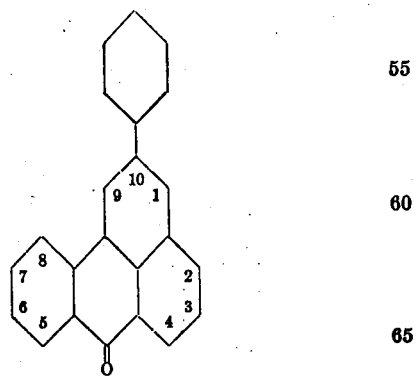

which represents 10-phenylbenzanthrone.

Our novel compounds dissolve in concentrated sulfuric acid with characteristic colors, which are however different from those of the isomeric parent materials. They are usually yellow colored well crystallized substances and are soluble to a certain extent in many organic solvents.

This molecular rearrangement takes place readily when heating the 1-phenyl-benzanthrone compounds to temperatures of above 100° C.; mixtures of anhydrous aluminium chloride and alkali metal chlorides are particularly suited for promoting this reaction, but other acid condensing agents will similarly induce this reaction.

It is not necessary to start from isolated 1-phenyl-benzanthrone compounds. The melts as obtained when heating cinnamylidene anthrones to temperatures of about 250° C. and containing the 1-phenyl-benzanthrone compounds, can be reacted upon directly with an acid condensing agent, the molecular rearrangement takes place and our novel, isomeric phenyl-benzanthrone compounds are likewise obtained.

The following examples will further illustrate our invention, the parts being by weight.

*Example 1.*—A mixture of 4 parts anhydrous aluminium chloride and 1 part sodium chloride are molten and at 120–125° C. one part 1-phenyl-benzanthrone of the melting point 181° C. gradually added. After all has been introduced the melt is kept at the same temperature for a little longer, it is then poured into water acidified with hydrochloric acid and well boiled up. The precipitate is then filtered off, washed and dried. It is obtained by crystallization from glacial acetic acid, preferably with a little animal charcoal, as well crystallized yellow needles, melting at 199–200° C. Compared with the cherry-red color of the sulfuric acid solution of the 1-phenyl-benzanthrone, the sulfuric acid solution of the novel isomeric phenyl-benzanthrone is yellowish-red, and turns quickly orange-red with strong yellow fluorescence. The novel compound has the same elementary composition as the parent material. It is an isomeric phenyl-benzanthrone of the probable formula:

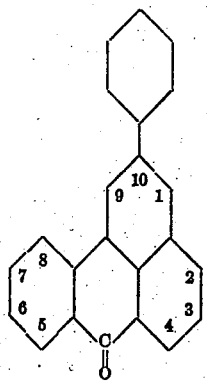

*Example 2.*—1 part cinnamylidene-anthrone is heated to 260° C. until formation of the 1-phenyl-benzanthrone is complete, the melt is allowed to cool to about 150° C. when it is still liquid, it is then poured into a molten mixture of 4 parts anhydrous aluminium chloride and 1 part sodium chloride kept at a temperature of 120–125° C., the melt is kept at this temperature for a little while, then poured into water, acidified with hydrochloric acid, boiled up, filtered off, the precipitate washed and dried. After crystallization from glacial acetic acid yellow needles are obtained which are identical with the 10-phenyl-benzanthrone of Example 1.

*Example 3.*—3 parts 1-phenyl-alpha-hydroxy-benzanthrone containing the hydroxyl in the 4, 5 or 8 position are gradually added to a molten mixture of 12 parts anhydrous aluminium chloride and 3 parts sodium chloride heated to 130–140° C. The melt is kept at this temperature for a little while, then poured into water, acidified with hydrochloric acid, boiled up and the precipitate isolated in the usual manner. A yellow crystalline powder is obtained. Compared with the orange sulfuric acid solution with red fluorescence of the parent 1-phenyl-alpha-hydroxy-benzanthrone the novel isomeric phenyl-alpha-hydroxy-benzanthrone dissolves in concentrated sulfuric acid with an orange color showing a green fluorescence.

*Example 4.*—10 parts 1-phenyl-beta-chlor-benzanthrone containing the chlorine in the 2, 3, 6 or 7 position are added to a molten mixture of 10 parts sodium chloride and 40 parts anhydrous aluminum chloride heated to 130–140° C. and kept at this temperature for a while, the melt is then poured into water and the precipitate worked up as in Example 1. The crude product is crystallized from pyridine. It is obtained as yellow crystals which dissolve in concentrated sulfuric acid with a red color, slightly different from the parent 1-phenyl-beta-chlor-benzanthrone.

We claim:

1. The process of producing isomeric phenyl-benzanthrone compounds which consists in treating 1-phenyl-benzanthrone compounds with an acid condensing agent.

2. The process of producing isomeric phenyl-benzanthrone compounds which consists in treating 1-phenyl-benzanthrone compounds with anhydrous aluminium chloride.

3. The process of producing isomeric phenyl-benzanthrone compounds which consists in treating 1-phenyl-benzanthrone compounds with a molten mixture of anhydrous aluminium chloride and an alkali metal chloride at temperatures of between about 100 and 150° C.

4. The process of producing isomeric phenyl-benzanthrone compounds which consists in treating with anhydrous aluminium chloride the crude melt as obtained by heating cinnamylidene-anthrone compounds to temperatures of around 250° C. and containing 1-phenyl-benzanthrone compounds.

5. The process of producing 10-phenyl-benzanthrone which consists in treating 1-phenyl-benzanthrone at temperatures of about 120–125° C. with a molten mixture of anhydrous aluminium chloride and sodium chloride and isolating the 10-phenyl-benzanthrone compound from the melt.

6. As new products Bz-phenyl-benzanthrone compounds which are isomeric with 1-phenyl-benzanthrone compounds, which are yellow colored crystalline substances, dissolving in concentrated sulfuric acid with colors different from those of the sulfuric acid solutions of the corresponding 1-phenyl-benzanthrone compounds and which are substantially identical with the products obtained when treating at temperatures of about 100–150° C. 1-phenyl-benzanthrone compounds with anhydrous aluminium chloride.

7. As a new product 10-phenyl-benzanthrone which is isomeric with 1-phenyl-benzanthrone, which when crystallized from glacial acetic acid forms yellow needles, melting at 199–200° C., dissolving in concentrated sulfuric acid with a yellowish-red color and which is substantially identical with the product obtained by treating 1-phenyl-benzanthrone at about 120–125° C. with a molten mixture of anhydrous aluminium chloride and sodium chloride.

In testimony whereof, we affix our signatures.

ROBERT BERLINER.
BERTHOLD STEIN.
WILLY TRAUTNER.